United States Patent Office

2,738,340
Patented Mar. 13, 1956

2,738,340

UREA-PINENE-SULFIDE REACTION PRODUCT

Guy M. Verley, Harvey, Ill., assignor to Sinclair Refining Company, New York, N. Y., a corporation of Maine No Drawing. Application May 20, 1952,
Serial No. 288,949

1 Claim. (Cl. 260—77.5)

My invention relates to corrosion inhibition and more particularly to an oil-insoluble resin which has special utility as a corrosion inhibiting additive in aqueous systems. The additive of my invention substantially comprises the oil-insoluble portion of a modified reaction product of turpentine or pinene and phosphorus sulfide, particularly phosphorus pentasulfide. My additive provides a means whereby the serious economic loss occasioned by the corrosion of various metallic surfaces, particularly iron and steel, in contact with fresh or salt water, methyl and other lower molecular weight monohydric alcohols, ethylene and higher glycols, and the like, may be substantially reduced.

Phosphorus and sulfur containing additives of the types represented by the condensation product of turpentine and a phosphorus sulfide, the reaction product of an aliphatic alcohol with such a condensation product, or the reaction product of an alkylated phenol with such a condensation product are described respectively in U. S. Patents 2,486,188; 2,392,252, and 2,409,877 to Robert L. May. These additives possess valuable oxidation inhibiting properties when incorporated in lubricating oils. Under certain conditions of use, however, usually involving excessive oil temperature or water leaks and the like, it has been found that engine oils inhibited with these materials cause corrosion of silver bearing surfaces of diesel engines.

In my co-pending application, Serial No. 276,037 filed March 11, 1952, I have described how these reaction products can be advantageously modified by reaction with urea. The modified additives are produced by effecting reaction at elevated temperature for a period of time varying inversely with the temperature required to convert the pinene-phosphorus sulfide inhibitor to the urea reaction product. Preferably about 4 per cent to about 8 per cent of urea is employed, with a temperature of about 250° to 400° F. and about six to twelve hours reaction time. I have found that in the course of reaction, apparently part of the original inhibitor is converted by the urea to an oil-insoluble resin which is removed from the product. The oil-insoluble resin is a very viscous fluid to a solid at room temperature. It is greyish yellow to brown in appearance and is soluble in low molecular weight alcohols, glycols, and water. It contains substantial amounts of phosphorus, sulfur and nitrogen and, as a product, amounts to between 10 to 15 per cent by weight of the urea reaction product. I have discovered that this oil-insoluble resin has valuable rust inhibiting properties in aqueous systems, such as cooling systems of internal combustion engines.

My invention therefore provides a new corrosion inhibitor which essentially comprises an oil-insoluble, water-soluble resin produced by treating a pinene and phosphorus sulfide reaction product at elevated temperature with about 2 to 20 per cent urea, but advantageously with about 4 per cent to about 8 per cent urea where urea modified phosphorus sulfide-pinene of optimum value for lubricating oil additive use are to be produced.

The reaction conditions usually fall within the range of about 250° to 400° F. and about six to twelve hours reaction time. The additive exhibits corrosion inhibiting properties at concentrations as low as, for example, 0.01 weight per cent in aqueous systems. Concentrations of the order of 0.1 weight per cent give satisfactory results in most applications.

Most advantageously, the preparation of the improved additives is conducted by reacting a phosphorus sulfide, preferably phosphorus pentasulfide, with alpha pinene for several hours at elevated temperature as described in the above-mentioned patents. If desired, an alkylated phenol such as tertiary butyl phenol or an aliphatic alcohol such as capryl alcohol may be added to the reaction mixture and heating continued. The reaction mixture then is diluted with a mineral oil in the lubricating oil viscosity range, urea is added, and reaction at about 250° to 400° F. is continued for one-half hour, up to about 6 to 12 hours longer. The oil-insoluble resin produced in the urea reaction is then filtered free of the oil-soluble product or otherwise separated by mechanical or gravitational means.

Where the pinene-phosphorus pentasulfide reaction product is further reacted with an alcohol before modification by urea reaction, it is especially advantageous to employ sufficient excess alcohol, e. g. amyl or hexyl alcohol, so that it may act as a reaction solvent common to both urea and the hydrocarbon materials and thus improve the efficiency of the reaction. After the addition of the required amount of oil to serve as a handling vehicle for the lubricating oil additive, the alcohol may be flashed off and recovered for subsequent reuse.

Alternatively an oil blend containing the pinene-phosphorus sulfide additive in its usual proportions may be treated with urea at elevated temperature in order to produce the oil-insoluble resin as a precipitated by-product of the urea modified additive which is formed in situ and remains in oil solution.

The alpha-pinene starting material is termed pinene since technical grade turpentine and pinene products which are available are useful and are obviously much more economical to employ than pure alpha pinene. The technical grade products in general contain about 90 per cent alpha pinene. The phosphorus sulfide of greatest value is phosphorus pentasulfide. Representative aliphatic alcohols and alkylated phenols are set out in the above-identified patents to Robert L. May but, in general, any hydroxy organic such as an alcohol or phenol which will not interfere with the oil-solubility of the additive and which does not contain functional groups or substituents introducing undesirable properties may be employed.

The amount of urea employed to modify the pinene and phosphorus sulfide reaction product is primarily determined by the properties desired in the corresponding oil-soluble portion of the urea modified reaction product, i. e. the lubricating oil additive, and by the economics of its manufacture. As little as 2 per cent urea or upwards of 15–20 per cent of urea may be employed. Allowing for variations in compositions and reaction conditions, about 4 per cent to 8 per cent urea however is preferred.

In general, the reaction time required to produce a resin which accomplishes effective reduction in corrosivity is correlative to the temperature thus, with 4 per cent to 8 per cent urea, reaction times of approximately six hours at 275° to 320° F. are sufficient greatly to reduce corrosivity. Reaction at 400° F. with 4 per cent urea for one-half hour also is sufficient. Longer reaction times, twenty-four hours at 275° F. with 8 per cent urea or at 320° F. with 4 per cent or 8 per cent urea, for example, increase the amount of phosphorus that appears in the oil-insoluble resin.

The oil-insoluble resins of my invention are, depending on the proportion of the reactants and the conditions of reaction including time and temperature, very viscous to solid at room temperature, grayish yellow to brown in appearance, and soluble in low molecular weight alcohols, glycols and water. They contain substantial amounts of phosphorus, sulfur and nitrogen. A typical resin, for example such as is described in Example I, has an acid number of 47.08, a saponification number of 203.7, 5.58 per cent phosphorus, 8.48 per cent sulfur, and 28 per cent nitrogen.

The better pinene-phosphorus sulfide additives contain from about 7 to about 10 moles of pinene reacted for every 2 moles of phosphorus pentasulfide. If an alcohol or alkylated phenol is incorporated, the proportion of alcohol or phenol or total mixture thereof is in the range of about 1 to 3 moles based on 2 moles of phosphorus sulfide. These proportions are established by the desirability of obtaining a reaction product free from excessive amounts of unreacted materials. The proportions are otherwise not critical and may be varied to obtain a product of desired phosphorus and sulfur content. As noted above, the urea modification results in loss of some phosphorus and sulfur from the oil soluble portion of the reaction product, while incorporating a small percentage of nitrogen. The loss may be anticipated and provided for by using sufficient phosphorus sulfide in relation to the organics in the condensation reaction.

Details in the preparation and evaluation of the improved additives will be described by means of illustrative examples.

Example I

To 26.34 moles (3600 grams) of alpha pinene, 6 moles (1332 grams) of phosphorus pentasulfide were added during the course of one hour, maintaining the temperature at 275° F. After six hours heating 2.34 moles (348 grams) of para-tertiary butyl phenol were added. The mixture was heated for six hours, then 0.57 mole (60 grams) of 2-ethyl butanol were added and the heating continued for six hours longer at 275° F. 4660 grams of a Mid-Continent solvent treated neutral oil of 205 SUS viscosity at 100° F. and 78 viscosity index were added to obtain a phosphorus concentration of 3.7 per cent. The yield was 9930 grams of a product having the following analysis: Acid No. 1.13, saponification No. 69.6, per cent phosphorus—3.72, per cent sulfur—9.85, molar S/P—2.56, and color (NPA)—4 minus.

To 9880 grams of the above material, 800 grams of commercial technical grade urea were added while maintaining the temperature at 280° F. The mixture was heated and stirred at 280–300° F. for six hours. The product was then filtered at 120° F. in the presence of about 1 per cent filter aid. The yield was 9200 grams of product having the following analysis: Acid No. 1.73, saponification No. 57.2, per cent phosphorus—3.10, per cent sulfur—9.05, molar S/P—2.85, color (NPA)—4 minus, per cent nitrogen—0.11 and loss of phosphorus—17 per cent.

The light colored resin remaining in the flask was washed twice with n-hexane, dried and weighed. The yield was 1430 grams of light golden resin having the following analysis: Acid No. 47.08, saponification No. 203.7, per cent phosphorus—5.58, per cent sulfur—8.48 and per cent nitrogen—28. The resin was entirely soluble in methanol or water.

Example II

To 8.78 moles (1200 grams) of alpha-pinene, 2 moles (444 grams) of phosphorus pentasulfide were added during the course of one hour, maintaining the temperature at 275° F. After 6 hours heating 0.78 mole (116 grams) of para-tertiary butyl phenol were added. The mixture was heated for 6 hours, then 0.19 mole (20 grams) of 2-ethyl butanol were added and the heating continued for 6 hours longer at 275° F. 2130 grams of a Mid-Continent solvent treated neutral oil of 205 SUS viscosity at 100° F. and 78 viscosity index were added to give a phosphorus concentration of 3.30 per cent. The product was filtered clear to yield 3850 grams of product. The product has the following analysis: Acid No. 1.78, saponification No. 59.2, per cent phosphorus—3.30, per cent sulfur—8.67, molar S/P—2.55. Typical inspection tests are: Gravity—13.6° API, vis. at 100° F.—1018, vis. at 210° F.—67.2 and color (NPA)—5 minus.

To 3259 grams of this product, 250 grams of commercial urea were added and the mixture heated progressively under a nitrogen atmosphere, with good stirring while the temperature was maintained at 400° F. for 2 hours. Upon reaching 400° F. the flocculent resin started to agglomerate into a hard mass with a loss of ammonia. At the end of 3 hours all the resin was deposited in a brittle, light colored mass on the flask walls, stirrer and thermowell. The supernatant liquid was light colored and nearly clear. The supernatant liquid was filtered at 130° F. with about 1 per cent filter aid. The yield was 2157 grams of product having the following analysis: per cent phosphorus—2.06, per cent sulfur—7.30, S/P—3.30, per cent nitrogen—0.26, color (NPA)—4, and loss of phosphorus—38 per cent.

The treatment with urea for 4 hours at 400° F. is rather severe, with a large loss of phosphorus to oil-insoluble resin. After washing the flask twice with hexane, 314 grams of brittle resin remained. It was extracted successively with hot methanol and with boiling water, to give three fractions.

Fraction I—soluble in hot methanol—74 grams of a golden yellow resin. Analysis: per cent phosphorus—8.19, per cent sulfur—10.15 and per cent nitrogen—20.32.

Fraction II—soluble in hot water (and insoluble in methanol)—45 grams brown, tacky, viscous material. Analysis: per cent phosphorus—11.23, per cent sulfur—0.71 and per cent nitrogen—24.60.

Fraction III—insoluble in hot methanol and hot water—94 grams of a gray powder. Analysis: per cent phosphorus—2.07, per cent sulfur—3.26 and per cent nitrogen—31.17.

The reaction at 400° F. changes the nature of the resin formed in that it is no longer completely soluble in water or methanol.

The novel additives of my invention may be used effectively in reducing the corrosion which normally takes place in the cooling systems of internal combustion engines in which fresh water, methyl alcohol, ethyl alcohol, ethylene glycol, propylene glycol and mixtures thereof are circulated as a cooling medium. They also may be used to advantage in reducing the metallic corrosion customarily encountered in refinery cooling water systems in which the cooling water is continuously passing through an atmospheric cooling tower and returned to the equipment being cooled, for example, a condenser. In addition, the additives of my invention are especially useful in reducing corrosion in refinery operations in which condensate water is encountered.

In order to demonstrate the effectiveness of the inhibitor of my invention, a test procedure was used which consisted of total immersion of ½ inch by 4 inch steel rod test coupons, freshly degreased and polished with emery paper, in condensate water maintained at 75° F. for seventy-two hours and mechanically stirred. The coupons were then inspected and rated, the results being reported as milligrams loss per day per square decimeter of steel surface. A test was first run on condensate water without any corrosion inhibiting additive. Subsequent tests were run with urea as the corrosion inhibiting additive, with the oil-insoluble resin as the additive, with an additive prepared by bubbling gaseous ammonia through a methanol solution of the oil-insoluble resin of my invention until alkaline to phenolphthalein, followed by topping the methanol, and with an additive comprising ammonium mahogany sulfonate. The results of these tests appear in the table below.

| Sample | Concentration, percent by wt. | Mg. loss per day per square decimeter |
|---|---|---|
| Blank | | 128 |
| Urea | 0.05 | 132 |
| | 0.005 | 130 |
| Oil-insoluble resin | 0.10 | 21 |
| | 0.01 | 95 |
| Oil-insoluble resin neutralized with NH₃ | 0.10 | 124 |
| | 0.01 | 143 |
| Ammonium mahogany sulfonate | 0.10 | 5.1 |
| | 0.01 | 26.0 |

The test results indicate that the incorporation of as little as 0.01 per cent by weight of the oil-insoluble resin of my invention substantially reduces corrosion in condensate water systems and that the incorporation of only about 0.10 per cent by weight of the additive of my invention substantially eliminates corrosion in such systems. The tests also indicate that unreacted urea, which could be present up to 50 per cent in the crude resin of my invention, has no inhibiting properties under the same conditions and in addition, that neutralization of the resin by ammonia appears to decrease considerably its corrosion inhibiting properties. Moreover, the tests indicate that the corrosion inhibiting properties of the oil-insoluble resin additive of my invention are of the same order as those of commercial ammonium mahogany sulfonate corrosion inhibitors.

I claim:

A corrosion inhibitor which essentially comprises an oil-insoluble, water-soluble resin produced by reacting a pinene and phosphorus sulfide reaction product at elevated temperature with about 2 per cent to about 20 per cent urea.

References Cited in the file of this patent

UNITED STATES PATENTS

| 2,356,073 | May | Aug. 15, 1944 |
| 2,507,731 | Mixon | May 16, 1950 |
| 2,607,736 | Watkins | Aug. 19, 1952 |
| 2,613,205 | Hill | Oct. 7, 1952 |
| 2,654,711 | Kirshenbaum | Oct. 6, 1953 |

FOREIGN PATENTS

| 460,232 | Canada | Oct. 11, 1949 |